United States Patent Office 2,985,623
Patented May 23, 1961

2,985,623
PROCESS FOR THE PRODUCTION OF FORM-
ALDEHYDE POLYMERS

Otto Schweitzer, Konigstein (Taunus), and Wilhelm Querfurth, Oberursel (Taunus), Germany, assignors to Deutsche Gold- und Silber-Scheideanstalt vormals Roessler, Frankfurt am Main, Germany No Drawing. Filed Feb. 21, 1958, Ser. No. 716,549
Claims priority, application Germany Feb. 23, 1957
7 Claims. (Cl. 260—67)

The present invention relates to an improved catalytic process for the production of formaldehyde polymers from monomeric formaldehyde.

It is already known that polymers of formaldehyde, the so-called eupolyoxymethylenes, can be formed into clear colorless shaped bodies, such as, for example, pliable films or filaments. Such filaments can also be stretched. In the production of such eupolyoxymethylenes it is expedient to introduce monomeric formaldehyde, preferably in vapor form, into a solvent containing catalysts, such as, for example, tertiary amines.

It has further become known to polymerize formaldehyde by introducing monomeric formaldehyde, also preferably in vapor form, into an inert solvent at temperatures which may be between −100 and +100° C. The polymerization in solvents can be promoted by catalysts and primary, secondary or tertiary aliphatic or aromatic amines are recommended for this purpose. Arsines, stibines, phosphines, hydrazines, morpholines and aminoalkanols, as well as cobalt carbonyl compounds, can also be used as catalysts instead of the amines. The polyoxymethylenes thus obtained can be shaped with the aid of heat and pressure to filaments, films and other shaped bodies.

According to the invention, it was found that the above-mentioned process for the production of polyoxymethylenes could be considerably improved by employing an organic peroxide or hydroperoxide in combination with a reducing compound as the catalyst. Such combinations are designated as Redox-catalysts in other polymerization reactions.

A very good catalyst combination according to the invention is composed of an organic peroxide or hydroperoxide and an organic primary, secondary or tertiary amine. Aliphatic tertiary amines have proved especially well suited. Excellent results were obtained using β-phenylethyl dibutyl amine.

Organic quaternary nitrogen compounds can also be employed in place of amines. A further well suited catalyst combination is composed of an organic peroxide or hydroperoxide together with small amounts of copper, manganese or zinc compounds. Organic compounds of these metals have proved especially well suited. The best results were obtained using the naphthenates, abietates or acetonylacetate. The preferred metal is copper.

The reducing components indicated can be used separately or in combination.

The polymerization according to the invention is expediently carried out in a solvent in which the polymerization product is insoluble. Benzine or liquid cycloaliphatic compounds, such as decahydronaphthalene, have been found especially suited. The quantities of the solvent, as well as the temperatures employed, can vary within wide limits. In many instances, it is advantageous to work at temperatures below 0° C.

In many cases it is expedient to carry out the polymerization in the absence of elemental oxygen and it is advantageous to pass a stream of an inert gas, such as nitrogen, through the liquid reaction medium.

The polymers produced according to the invention can be shaped at elevated temperatures and can be processed in appropriate apparatus, such as, for example, injection moulding apparatus. Stabilizers, ageing retardants, lubricants, pigments, light protecting agents, or fillers can be incorporated in the polymers produced according to the invention. It is also possible to incorporate powders of other polymers with the shapeable polyoxymethylene polymers, such as, for example, powdered condensation products of formaldehyde with phenol or urea. It is also possible to process such polyoxymethylene polymers together with other monomeric or polymeric vinyl or alkyl compounds or with converted natural products, such as gelatin, casein or the like.

The following examples will serve to illustrate several embodiments of the process according to the invention:

Example 1

Monomeric formaldehyde vapor was introduced into a solution of 0.1% of tributylamine and 0.02% dibenzoyl peroxide in decahydronaphthalene at 25° C. The formaldehyde vapor had previously been freed of moisture and polymeric components by cooling down to −18° C. The introduction of the formaldehyde vapor into the decahydronaphthalene solution was continued for an hour and forty-five minutes. The polymer produced precipitated in insoluble form and was separated at the end of the reaction by filtration. The yield amounted to 89% of the formaldehyde used. The unconverted formaldehyde bubbled up through the reaction liquid. The polymer obtained was a high molecular weight substance which only slowly decomposed even at elevated temperatures. It can be shaped at elevated temperatures to films or other shaped bodies.

In comparison, when a solution of tributyl amine in the absence of the peroxide was used as the reaction medium, the yield was only 64% and when a solution of the peroxide in the absence of the tributyl amine was used, the yield was only 28%.

Example 2

26.4 g. of technical formaldehyde were heated to 150° C. and a weak stream of nitrogen was passed thereover to carry off resulting decomposition products which essentially consisted of pure monomeric formaldeyde. The resulting gases were first passed through two condensers maintained at −15° C. to remove any water contained therein and then passed into the reaction vessel which containing 450 cc. of benzine having a boiling point of 100 to 140° C. The benzine contained 630 mg. of dibenzoyl peroxide, 433 mg. of β-phenylethyl dibutyl amine and 30 mg. of copper naphthenate. The temperature of the benzine at the beginning of the test was 20.4° C. and then rose to 32.6° C. at the end of the test.

13.2 g. of highly polymeric formaldeyde having a relative viscosity of 1.38 (corresponding to a k value of 54) were produced upon passage of the gas through the reaction vessel. 0.68 g. of monomeric formaldehyde and 8.3 g. of low polymeric formaldehyde could be recovered and can be recycled to the decomposition apparatus for the paraformaldehyde.

Example 3

24.9 g. of technical paraformaldehyde were processed as in Example 2 except that the benzine in the reaction vessel contained 396 mg. of dibenzoyl peroxide and 400 mg. of cetyl trimethyl ammonium bromide and that the temperature in the reaction vessel at the beginning of the test was 21.5° C. and this rose to 30.4° C. at the end of the test. 12.3 g. of highly polymeric formaldehyde having a relative viscosity of 1.44 (corresponding to a k value of 57) were produced. 0.47 g. of monomeric formaldehyde and 9.27 g. of low polymeric formaldehyde could be recovered and can be recycled to the decomposition apparatus for the paraformaldehyde.

Example 4

24.9 g. of technical paraformaldehyde were processed as in Example 2 except that the reaction vessel contained 500 cc. of benzine in which 478 mg. of β-phenylethyl dibutyl amine and 692 mg. of dibenzoyl peroxide were dissolved and the temperature in the reaction vessel rose from 18.8° C. to 29.5° C. during the test. 13.6 g. of highly polymeric formaldehyde having a specific viscosity of 5.90 (corresponding to a k value of 144) were produced. 2.8 g. of monomeric formaldehyde and 8.46 g. of low polymeric formaldehyde could be recovered and can be recycled to the decomposition apparatus for the paraformaldehyde.

Example 5

27.2 g. of technical paraformaldehyde were processed as in Example 2 except that the benzine in the reaction vessel contained 396 mg. of dibenzoyl peroxide, 400 mg. of cetyl trimethyl ammonium bromide and 30 mg. of copper naphthenates and that the temperature in the reaction vessel at the beginning of the test was 21.2° C. and this rose to 33.4° C. at the end of the test. 15.9 g. of highly polymeric formaldehyde having a relative viscosity of 3.98 (corresponding to a k value of 124) were produced. 0.56 g. of monomeric formaldehyde and 8.05 g. of low polymeric formaldehyde could be recovered and can be recycled to the decomposition apparatus for the paraformaldehyde.

Example 6

25.1 g. of technical para-formaldehyde were processed as in Example 2 except that the benzine in the reaction vessel contained 390 mg. of cumene hydroperoxide, 434 mg. of β-phenylethyl dibutyl amine and no copper compound and that the temperature in the reaction vessel at the beginning of the test was 22° C. and this rose to 32° C. at the end of the test. 10.4 g. of highly polymeric formaldehyde having a relative viscosity of 1.30 (corresponding to a K value of 50) were produced. 1.99 g. of monomeric formaldehyde and 9.06 g. of low polymeric formaldehyde could be recovered and can be recycled to the decomposition apparatus for the paraformaldehyde.

Example 7

24.8 g. of technical paraformaldehyde were processed as in Example 2 except that the benzine in the reaction vessel contained 700 mg. of tertiary butyl hydroperoxide, 434 mg. of β-phenylethyl dibutyl amine and no copper compound and that the temperature in the reaction vessel at the beginning of the test was 24° C. and this rose to 29.6° C. at the end of the test. 5.6 g. of highly polymeric formaldehyde having a relative viscosity of 2.12 (corresponding to a K value of 89) were produced. 6.93 g. of monomeric formaldehyde could be recovered and can be recycled to the decomposition apparatus for the paraformaldehyde.

Example 8

24.3 g. of technical paraformaldehyde were processed as in Example 2 except that the benzine in the reaction vessel contained 623 mg. of p,p'-dichlorodibenzoylperoxide, 434 mg. of β-phenylethyl dibutyl amine and no copper compound and that the temperature in the reaction vessel at the beginning of the test was 24° C. and this rose to 30.8° C. at the end of the test. 9.6 g. of highly polymeric formaldehyde having a relative viscosity of 1.06 (corresponding to a K value of 20) were produced. 3.67 g. of monomeric formaldehyde and 8.28 g. of low polymeric formaldehyde could be recovered and can be recycled to the decomposition apparatus for the paraformaldehyde.

Example 9

27.4 g. of technical paraformaldehyde were processed as in Example 2 except that the benzine in the reaction vessel contained 700 mg. of dibenzoylperoxide, 515 mg. of dimethyl-p-toluidine and no copper compound and that the temperature in the reaction vessel at the beginning of the test was 19.5° C. and this rose to 24.8° C. at the end of the test. 9.2 g. of highly polymeric formaldehyde having a relative viscosity of 1.95 (corresponding to a K value of 84) were produced. 6.7 g. of monomeric formaldehyde and 9.7 g. of low polymeric formaldehyde could be recovered and can be recycled to the decomposition apparatus for the paraformaldehyde.

Example 10

28.2 g. of technical paraformaldehyde were processed as in Example 2 except that the benzine in the reaction vessel contained 700 mg. of dibenzoylperoxide, 730 mg. of dimethylaniline and no copper compound and that the temperature in the reaction vessel at the beginning of the test was 18.5° C. and the this rose to 25.5° C. at the end of the test. 5.9 g. of highly polymeric formaldehyde having a relative viscosity of 1.97 (corresponding to a K value of 85) where produced. 7.3 g. of monomeric formaldehyde and 10.0 g. of low polymeric formaldehyde could be recovered and can be recycled to the decomposition apparatus for the paraformaldehyde.

Example 11

28.4 g. of technical paraformaldehyde were processed as in Example 2 except that the benzine in the reaction vessel contained 700 mg. of dibenzoylperoxide, 445 mg. of dimethylcyclohexylamine and no copper compound and that the temperature in the reaction vessel at the beginning of the test was 18.2° C. and this rose to 32.0° C. at the end of the test. 15.0 g. of highly polymeric formaldehyde having a relative viscosity of 1.93 (corresponding to a K value of 83) were produced. 0.9 g. of monomeric formaldehyde and 9.3 g. of low polymeric formaldehyde could be recovered and can be recycled to the decomposition apparatus for the paraformaldehyde.

Example 12

28.0 g. of technical paraformaldehyde were processed as in Example 2 except that the benzine in the reaction vessel contained 700 mg. of dibenzoylperoxide, 550 mg. of p-chlorodiethylol aniline and no copper compound and that the temperature in the reaction vessel at the beginning of the test was 16.3° C. and this rose to 21.2° C. at the end of the test. 6.6 g. of highly polymeric formaldehyde having a relative viscosity of 2.21 (corresponding to a K value of 92) were produced. 6.5 g. of monomeric formaldehyde and 11.3 g. of low polymeric formaldehyde could be recovered and can be recycled to the decomposition apparatus for the paraformaldehyde.

Examples of organic peroxides and hydroperoxides which may be used in combination with a reducing compound as catalysts include: dibenzoylperoxide, 4,4'-dichlordibenzoylperoxide, cumenehydroperoxide, tert.-butyl hydroperoxide etc. The preferred peroxide is dibenzoylperoxide.

Examples of the reducing compounds which may be used in combination with organic peroxides or hydroperoxides as catalysts include: dimethyl-p-toluidine, dimethylaniline, dimethyl-cyclohexylamine, p-chloro diethylol-aniline, cetyl trimethyl ammonium bromide, tributylamine etc.

The amounts of redox-catalyst being present are ranging from 0.01 to 1.0%, preferably from 0.1 to 0.5%, calculated upon the solvent employed.

The preferred ratio of the percompound to the reducing component is from 0.5 to 2.5 moles of the percompound to 1 mole of the reducing component.

The concentration of copper, zinc or manganese is preferably less than about 0.01%. In the most instances the concentration is only about 0.001 to 0.003%.

The polymerization may be carried out at temperatures between —100 and +100° C. The preferred temperature is about room temperature.

We claim:

1. A process for polymerizing monomeric formaldehyde to produce a polyoxymethylene which comprises contacting monomeric formaldehyde with a redox catalyst composed of a combination of a per compound selected from the group consisting of catalytic organic peroxides and catalytic organic hydroperoxides and of a reducing compound selected from the group consisting of amines and quaternary ammonium salts in an inert solvent in the absence of water at a temperature between —100° C. and +100° C., the quantity of such catalyst being between 0.01 to 1.0% calculated on the solvent employed and the ratio of the per compound to the reducing compound being 0.5 to 2.5 moles of the per compound to 1 mole of the reducing compound.

2. The process of claim 1 in which said reducing compound is an amine.

3. The process of claim 1 in which said reducing compound is an aliphatic tertiary amine.

4. The process of claim 1 in which said reducing compound is β-phenylethyl dibutyl amine.

5. The process of claim 1 in which said reducing compound is an organic quaternary ammonium compound.

6. The process of claim 1 in which relatively small quantities of a heavy metal compound selected from the group consisting of copper, zinc and manganese compounds is employed in conjunction with said per compound.

7. The process of claim 1 in which said polymerization is carried out in the absence of elemental oxygen.

References Cited in the file of this patent
UNITED STATES PATENTS
2,734,889 Starr _____ Feb. 14, 1956
OTHER REFERENCES
Walker: "Formaldehyde," A.C.S. Monograph #120 (1953), pp. 187–190.